(12) United States Patent
Chen et al.

(10) Patent No.: US 7,266,656 B2
(45) Date of Patent: Sep. 4, 2007

(54) MINIMIZING SYSTEM DOWNTIME THROUGH INTELLIGENT DATA CACHING IN AN APPLIANCE-BASED BUSINESS CONTINUANCE ARCHITECTURE

(75) Inventors: Ying Chen, San Jose, CA (US); Binny Sher Gill, San Jose, CA (US); Lan Huang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/835,299

(22) Filed: Apr. 28, 2004

(65) Prior Publication Data

US 2005/0246575 A1    Nov. 3, 2005

(51) Int. Cl.
G08F 12/00    (2006.01)
(52) U.S. Cl. ...................................... 711/162; 707/202
(58) Field of Classification Search ................ 711/162
See application file for complete search history.

(56) References Cited

U.S. PATENT DOCUMENTS

| | | | |
|---|---|---|---|
| 6,301,677 B1 | 10/2001 | Squibb | |
| 6,529,944 B1 * | 3/2003 | LeCrone | 709/211 |
| 6,581,143 B2 * | 6/2003 | Gagne et al. | 711/162 |
| 2003/0172157 A1 | 9/2003 | Wright et al. | |

OTHER PUBLICATIONS

A. V. Aho et al., "Principles of Optimal page Replacement", Journal of the Assoc. for Computing Machinery, vol. 18, No. 1, Jan. 1971, pp. 80-093.

Richard W. Carr et al., "WSClock—A Simple and Effective Algorithm for Virtual Memory Management", ACM, 8th Symposium on Operation System Principles, 1981, pp. 87-95.

A. Chiaffitelli et al., "Business Continuity and High Availability Tutorial for Spring SNW 2003", Part 1 of 2, Apr. 14-17, 2003, 40 page presentation as available at http://www.snwusa.com/presentations.

P. J. Denning, "Working Sets Past and Present", IEEE Transactions on Software Engineering, vol. SE-6, No. 1, Jan. 1980, pp. 64-84.

EMC Corporation, "Symmetrix Remote Data Facility Product Description Guide", Jun. 2000, pp. 1-21.

(Continued)

Primary Examiner—Hyung Sough
Assistant Examiner—Hamdy Ahmed
(74) Attorney, Agent, or Firm—Mark C. McCabe; Marc D. McSwain

(57) ABSTRACT

A system for minimizing downtime in an appliance-based business continuance architecture is provided. The system includes at least one primary data storage and least one primary host machine. The system includes an intercept agent to intercept primary host machine data requests, and to collect information associated with the intercepted data requests. Moreover, at least one business continuance appliance in communication with the primary host machine and in communication with a remote backup site is provided. The appliance receives information associated with the intercepted data requests from the intercept agent. In addition, a local cache is included within the business continuance appliance. The local cache maintains copies of primary data storage according to the information received. Furthermore, the remote site is provided with the intercepted data requests via the business continuance appliance, wherein the remote site maintains a backup of the primary data storage.

26 Claims, 6 Drawing Sheets

OTHER PUBLICATIONS

Dave Hitz et al., "File System Design for an NFS File Server Appliance", Proceedings of USENIX Winter 1994 Technical Conference, San Francisco, CA, Jan. 19, 1994, pp. 235-246.

W. W. Hsu et al., "Characteristics of I/O traffic in personal computer and server workloads", IBM Systems Journal, vol. 42, No. 2, 2003. pp. 347-372.

"IBM Tivoli Storage Management Concepts", IBM Redbook, available on the web at http://publib-b.boulder.ibm.com/redbooks.nsf/RedpieceAbstracts/sg245757.html, Jul. 2003. pp. 43-55.

M. Ji et al., "Seneca: remote mirroring done write", Proceedings of USENIX Technical Conference, San Antonio, TX, Jun. 2003, pp. 253-268.

"Peer-to-Peer Remote Copy (PPRC)", IBM Redbook, IBM TotalStorage Enterprise Storage Server . . . , Chapter 4, available on the web at http://publib-b.boulder.ibm.com/redbooks.nsf/RedpieceAbstracts/sg245757.html, Jul. 2003, pp. 53-102.

J. Gecsei et al., "Evaluation techniques for storage hierarchies", IBM System Journal, vol. 9, No. 2, 1970, pp. 78-117.

N. Megiddo et al., "ARC: A Self-Tuning, Low Overhead Replacement Cache" Proceedings of the 2nd USENIX File & Storage Technologies Conference (FAST), Mar. 31, 2003, San Francisco, CA. pp. 115-130.

"Legato NetWorker 6 Comprehensive Data Protection", Legato Systems, Inc., 54 page white paper available on the web at http://portal2.legato.com/resources/whitepapers-/W067,pdf. 2001.

E. J. O'Neil et al., "The LRU-K Page Replacement Algorithm for Database Disk Buffering", Proceedings of ACM SIGMOD Conference, 1993, pp. 297-306.

H. Patterson et al., "SnapMirror: File System Based Asynchronous Mirroring for File Disaster Recovery", Proceedings of the FAST 2002 Conf. on File Storage Technologies, Monterey, CA, Jan. 28-30, 2002, pp. 117-129.

\* cited by examiner

MINIMIZING SYSTEM DOWNTIME THROUGH INTELLIGENT DATA CACHING IN AN APPLIANCE-BASED BUSINESS CONTINUANCE ARCHITECTURE

FIELD OF THE INVENTION

This disclosure describes an invention that uses data caching techniques in an appliance-based business continuance architecture to minimize system downtime during failure situations.

BACKGROUND OF THE INVENTION

In the information age, the importance of keeping data on-line at all times is becoming paramount, even as the amount of stored information is growingly exponentially. The need for Business Continuance (BC) and fast data recovery is acute and well-acknowledged. Today's businesses are extremely vulnerable to data loss and system downtime. The cost of data loss or an hour of downtime can result in losses up to millions of dollars. The most commonly adopted techniques to protect and recover data include Point-in-time data copy (PIT, also known as snapshot), backup and restore, remote data replication, or any combination of these. Each of these techniques is designed to deal with specific types of data loss or system failure scenarios.

PIT is designed to allow recovery of data from a copy at a time in the past when the snapshot was taken. The changes that were made after the last snapshot are usually lost. Typically, data will be inaccessible to applications while the recovery takes place. However, this technique usually cannot help in cases of system failure. Similarly, the backup and restore technique cannot guarantee zero data loss, since the changes that were made after the last backup are typically lost. If the backup was stored on tapes the recovery could be very slow and the system could be down for an unacceptable length of time. Remote data replication is another technique and comes in two flavors, synchronous and asynchronous. Only synchronous remote mirroring can avoid data loss during site-wide disasters, since a write from a calling application is not considered complete until the data is written successfully to both the local site and the remote site. However, this has a performance penalty on the applications. In asynchronous remote mirroring a write is considered to be completed just after writing to the local site. Subsequently, the updates are sent to the remote site as well. Thus, in a site-wide disaster, there would be data lost if there was some data pending to be sent to the remote site. With remote mirroring in place, it is possible to guarantee continuous data access in the presence of site wide failures by providing hot stand-by hosts and applications at the remote site and directing clients to the remote site when the primary site encounters a failure. In practice, such a solution is cost prohibitive for Small and Medium Businesses (SMBs) due to its purchase and maintenance costs.

Therefore, there is a need for an affordable solution which can provide a low probability of failure, and is capable of minimizing system downtime in response to a system failure. Such a solution would be beneficial for a wide range of systems where data is vulnerable to loss or unavailability

SUMMARY OF THE INVENTION

According to the present invention, there is provide a system for minimizing downtime in an appliance-based business continuance architecture. The system includes at least one primary data storage. In addition, the system includes at least one primary host machine, wherein the primary host machine can access data stored at the primary data storage. Also, the system includes an intercept agent at the primary host machine to intercept data requests made to the host machine and to collect access patterns and statistics associated with the intercepted data requests, wherein the intercepted data requests include data read requests and data write requests. Moreover, at least one business continuance appliance in communication with the intercept agent at the primary host machine and in communication with a remote backup site, wherein the business continuance appliance receives information associated with the intercepted data requests from the intercept agent. In addition, a local cache included within the business continuance appliance, wherein the local cache maintains copies of data associated the intercepted data requests, wherein the copies are maintained according to the access patterns and statistics received. Furthermore, the remote backup site to be provided with the intercepted data requests via the business continuance appliance, wherein the remote backup site maintains a secondary copy of the data located at the primary data storage. The data maintained by the local cache is utilized to provide a backup copy of data in the event of the primary site failing, without resorting to access of the remote backup site.

DETAILED DESCRIPTION

The invention will be described primarily as a system and method for minimizing system downtime through intelligent data caching in an appliance-based business continuance architecture. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
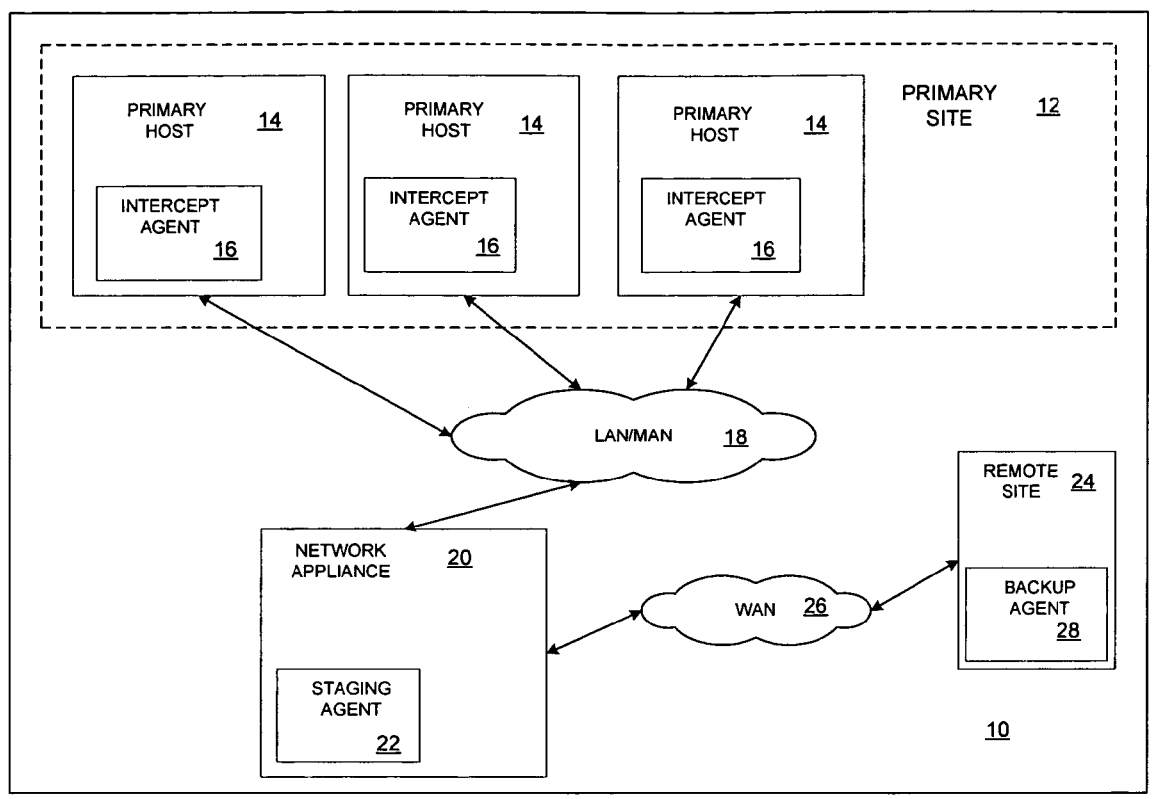
FIG. 1 shows an appliance-based business continuance architecture.

FIG. 1 shows an appliance-based business continuance architecture 10. In this architecture, data is stored and accessed by applications running at primary site 12. Primary site 12 is comprised of one or more primary hosts 14, where primary hosts 14 serve all I/O requests made by the applications. Each primary host 14 includes an intercept agent 16. Intercept agent 16 collects statistics and patterns associated with all data requests (read and write) made by the applications. Primary site 12 is connected to LAN/MAN 18.

Architecture 10 also includes network appliance 20. Network appliance 20 is connected to LAN/MAN 18. Network appliance 20 includes staging agent 22. Intercept agent 16 provides staging agent 22 with all of the collected statistics and access patterns. Moreover, intercept agent 16 provides staging agent 22 with all data requests and all data updates.

Architecture 10 also includes remote site 24. In an exemplary embodiment, remote site is attached to network appliance 20 via WAN 26. Remote site 24 includes backup agent 28. Backup agent 28 is responsible for maintaining a secondary copy of the primary site data through analyzing and applying updates received via staging agent 22. In an alternative embodiment, backup agent 28 could be co-located with the staging agent at network appliance 20.

Figure 2:
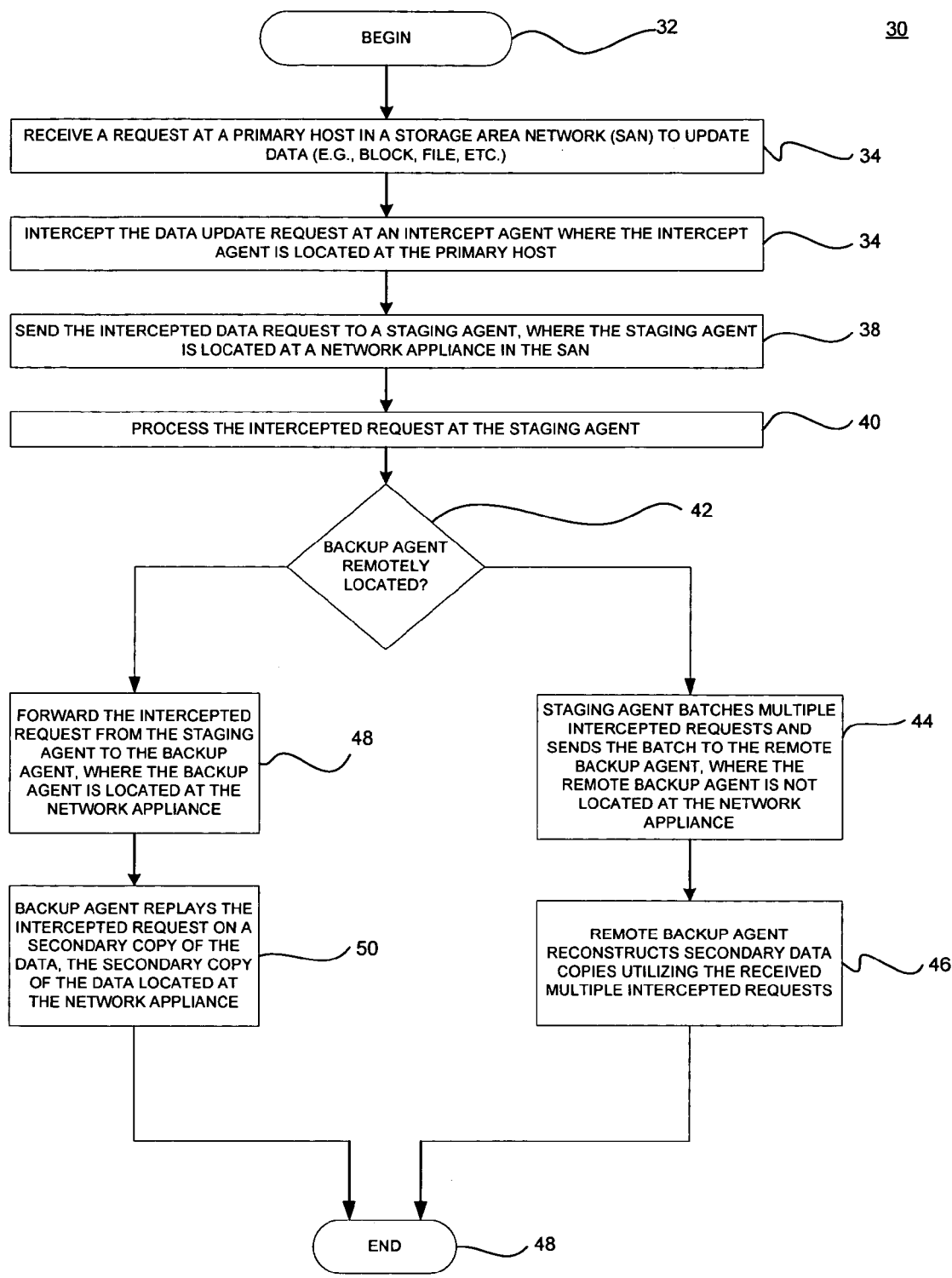
FIG. 2 illustrates a method of storing secondary copies of data in business continuance architecture.

FIG. 2 illustrates a method 30 of storing secondary copies of data in business continuance architecture 10. Within architecture 10, a secondary copy of the data stored at primary site 12 is maintained at remote site 24 and/or network appliance 20. With regards to the secondary copy of the data, it can be either synchronously or asynchronously updated. At block 32, method 30 begins.

At block 34, a request to update data (e.g., block, file, etc.) stored at primary site 12 is received at primary host 14. Primary site 12 includes primary storage (not shown) in communication with primary host 14 and for storing the requested data.

At block 36, intercept agent 16 intercepts the request to update data made at block 34. The intercept agent 16 is responsible for capturing all data update requests made via applications in communication with primary host 14.

At block 38, intercept agent 16 sends the captured data update requests to staging agent 22 at network appliance 20.

At block 40, staging agent 22 processes the captured data update requests received from intercept agent 16. Staging agent 22 maintains a persistent log associated with all captured data requests (e.g., read and write) sent by intercept agent 16. The persistent log can be a UPS-backed memory, NVRAM, disk, or some combination of these. In the preferred embodiment, UPS-backed memory is utilized, because it is fast and prevents data loss due to power failures or user application crashes. In an alternative embodiment, disks alone are utilized. In a further alternative embodiment, a small NVRAM and several disks are combined to reduce the overall appliance cost and still maintain high performance. Under this approach, requests are received into NVRAM first and are flushed to disks periodically to make room for new updates.

At block 42 a determination is made as to whether backup agent 28 is located at remote site 24 or network appliance 20. If yes, backup agent 28 is located at remote site 24, then at block 44, staging agent 22 processes the requests stored at the persistent log, batches the requests and sends the batch to backup agent 28 at remote site 24.

At block 46, backup agent 28 reconstructs secondary copies of the data associated with the captured data update requests utilizing the received batch of multiple intercepted data update requests. Request logging and batching significantly improves the network bandwidth efficiency and utilization over WAN 26 between network appliance 20 and remote site 24.

Returning to block 42. If no, the backup agent is not located at remote site 24, then at block 48, staging agent 22 periodically processes the persistent log and sends the requests to backup agent 28, where backup agent 28 is co-located with staging agent 22 at network appliance 20.

At block 50, backup agent 28 replays the captured data update request on to a secondary copy of the data, where the secondary copy of the data is located at network appliance 20.

At block 48, method 30 ends.

With regards to method 30, if the data is written synchronously to remote site 24, then intercept agent 16 waits until the data has been written to the secondary copy before returning the call to the application responsible for submitting the data request to primary site 12. If the data is written asynchronously, then at block 56, intercept agent 16 waits until staging agent 22 acknowledges that it has appended the request to the persistent log which it maintains at network appliance 20.

Also, with regards to method 30, data is not lost if a disaster at primary site 12 does not affect network appliance 20. This would be the most probable case if the network appliance 20 was on a MAN a few miles away. However, if both primary site 12 and network appliance 20 face a disaster at the same time, then some data can be lost if remote site 24 is only updated asynchronously and might be missing some updates. At least one study has shown that only 3% of the failure cases that incurred data loss and system downtime were caused by site-wide disasters. Thus, appliance based architecture 10 works well for 97% of the failure cases, and even for some fraction of the site disasters that do not involve network appliance 20. If the data protection and recovery requirements of primary site 12 are extremely stringent, the traditional synchronous mirroring from network appliance to the remote site can be done as an option.

Thus, appliance based architecture 10 provides the benefits of synchronous mirroring with a much lower performance penalty (roughly equivalent to asynchronous mirroring). Further, the operating cost of appliance based architecture 10 would be close to the cost of a system based on the traditional asynchronous mirroring approach.

Providing Data Availability

Figure 3:
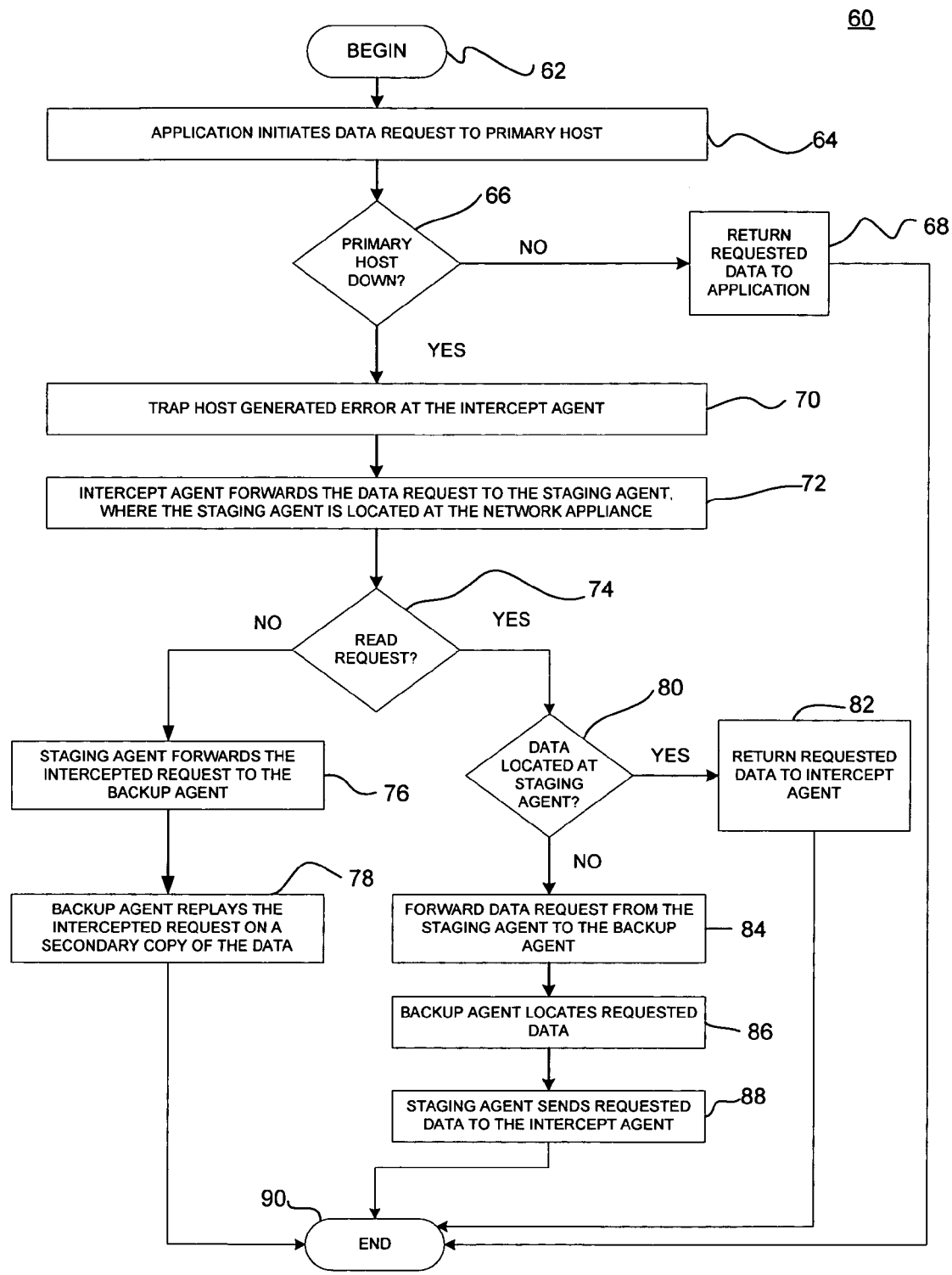
FIG. 3 illustrates a method of responding to application data requests to primary site when primary host has failed.

FIG. 3 illustrates a method 60 of responding to application data requests to primary site 12 when primary host 14 has failed. At block 62, method 60 begins.

At block 64, a data request via an application is initiated to primary host 14.

At block 66, a determination is made as to whether primary host 14 is down (e.g., failed, undergoing maintenance, etc.). If no, then at block 68, primary host 14 handles the data request.

Returning to block 66. If yes, then at block 70, intercept agent 16 traps data requests received at primary host 14. That is, intercept agent 16 traps the error that primary host 14 returns to the application.

At block 72, intercept agent 16 forwards the data requests to staging agent 22 at network appliance 20.

At block 74, a determination is made as to whether the trapped data request a read request. If no, then at block 76, staging agent 22 forwards the intercepted request to backup agent 28. At block 78, backup agent 28 replays the intercepted data request on a secondary copy of the data.

Returning to block 74. If yes, then at block 80, a determination is made as to whether the data is located at network appliance 20. If yes, then at block 82, the requested data is retrieved by staging agent 22 and sent to intercept agent 16. In determining whether the data is located at network appliance 20, staging agent 22 determines if the data is present in its log of updates pending to be sent to backup agent 28 at remote site 24. If the data is found in its entirety in the log at network appliance 20, then staging agent 22 can satisfy the data request. Having a secondary copy of the data present in the log reduces the negative effects of primary host 14 downtime.

Returning to block 80. If no, then at block 84, staging agent 22 forwards the request to backup agent 28.

At block 86, backup agent 28 attempts to locate the requested data and provides to staging agent 22. If not found, backup agent 28 sends staging agent 22 an error message.

At block 88, staging agent 22 forwards the requested data to the requesting intercept agent 16.

At block 90, method 60 ends. Importantly, for write requests, the processing done by intercept agent 16 is the same as when there is no failure. However, intercept agent 16 does block the error from reaching the application, and instead sends an administrative alarm of some sort.

Architecture 10 provides for the secondary data copy to have a data storage format that is completely different from the primary data copy. For example, it can use different storage devices running different software. As long as a module is provided to read the secondary data copy from the persistent storage, administrator can perform straightforward data copy to restore the lost data. This allows system developers to implement efficient storage systems to store secondary data copy. For instance, if the data replication is done at the file system layer, the secondary file system can choose to use log-structured or semi-log-structured file system, since it's mostly write-only. Storing secondary data copy in different storage devices may be one way to reduce the cost. Once the data has been made up-to-date with the on-line backup copy the primary data source can be again made on-line again to resume normal operation. This might require some help from intercept agent 16.

Architecture 10 does not mandate a particular type of data to be protected. It works independent of the storage software and hardware used. The communication protocol between the agents is independent of the type or level of data being protected (block-level, file-level, etc). Depending on the types of data to be replicated and the primary storage system used, different intercept agents 16 may need to be developed. However, intercept agent 16 typically is extremely lightweight and straight-forward to implement, as it only intercepts update requests and sends them to network appliance 20.

Although architecture 10 works well under normal conditions, it can suffer from a large performance degradation in situations where the secondary copy of data is remote. The applications could run with a heavily degraded performance for as long as primary host 14 cannot be brought back on-line. The degradation would be severe enough to render running the applications practically useless in most cases. The time it takes to bring primary host 14 data back on-line is a combination of the following factors: (1) Fixing the hardware problem in the primary host 14, if any; (2) If there was some data written in the meanwhile then that data must be collated from network appliance 20 and remote site 24, then written to the primary host's copy; (3) If primary host 14 has any data losses then those data-sets need to be copied as well—the data might need to be shipped via mail from remote site 24, as the network 26 bandwidth may either be too expensive or too little. This may result in the primary site 12 experiencing a long duration of degraded performance and possibly suffer huge monetary losses. The degradation in performance is often quite large leading to effection system downtime.

To overcome this degraded performance, architecture 10 is extended through the incorporation of an intelligent caching technique. The incorporated intelligent caching technique will allow the applications to run while a failure at primary site 10 is being remedied. That is, the applications will experience minimal performance degradation during the time the primary site is being repaired. Through utilization of the intelligent caching scheme, it is unnecessary to migrate applications to the site of the secondary copy of the data, as is typical in remote mirroring solutions.

Intelligent Appliance-Based Business Continuance Architecture

Figure 4:
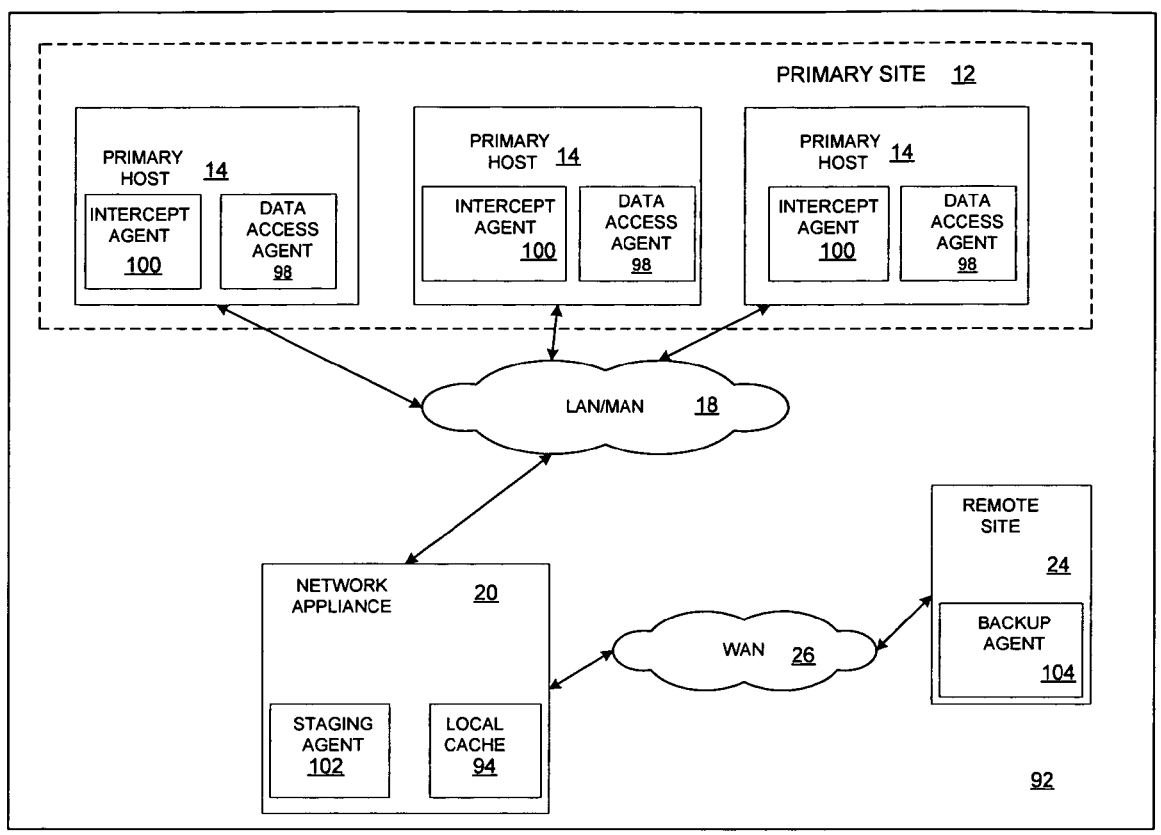
FIG. 4 shows an intelligent appliance-based business continuance architecture including an intelligent caching technique.

FIG. 4 shows an intelligent appliance-based business continuance architecture 92 including an intelligent caching technique. The inclusion of an intelligent caching technique provides for overcoming the architecture 10 issues discussed above. In architecture 92, data is stored and accessed by applications running at primary site 12. Architecture 92 is similar to architecture 10. However, architecture 92 includes local cache 94 within network appliance 20. In addition, primary host 14 includes data access agent 98. Also, intercept agent 16 has been replaced with intelligent intercept agent 100, staging agent 22 has been replaced with intelligent staging agent 102 and backup agent 28 has been replaced with intelligent backup agent 104. Each of the new intelligent agents (100, 102 and 104) provide all the functionality of the agents (16, 22 and 28) utilized in architecture 10, plus additional functionality to facilitate architecture 92 intelligent caching.

Intelligent Intercept Agent

In architecture 10, intercept agent 16 has two jobs: (1) to send updates to the staging agent 22; and (2) to trap I/O errors and redirect the requests to the staging agent 22 in a manner transparent to the requesting application. Intelligent intercept agent 100 includes all the functionality of intercept agent 16, with the additional ability to gathers access patterns and statistics information about the I/O that occurs on primary host 14. Statistics information includes what data is accessed (could be filenames or block addresses), who is reading or writing the data, how often the data is accessed or modified, when is the data accessed, etc. The contents of the read data are not forwarded to intelligent staging agent 102, such information need not be sent for every read operation. Instead, multiple records can be batched and piggybacked with updates that are sent for data replication. In an exemplary embodiment, a temporary in-memory buffer is allocated for batching. If there are no update requests for a long time, whenever the buffer is full, intelligent intercept agent 100 passes the recorded information to intelligent staging agent 102. Intelligent staging agent 102 also performs some statistical processing to reduce the amount of data to be sent to intelligent staging agent 102 whenever needed. Since intelligent staging agent 102 uses such information only for deciding which data is useful for caching and prefetching, a small delay in sending the statistics should not introduce significant impact.

In the preferred embodiment, intelligent intercept agent 100 is configurable by a system administrator as to what information it reports to intelligent staging agent 102. Further, intelligent intercept agent 100 can be configured so as to wait for the administrator to determine the exact nature of the failures before automatically redirecting requests to intelligent staging agent 102. Such configurations would vary depending on the needs of the organization utilizing architecture 92.

Intelligent Staging Agent

In architecture 10, staging agent 22 the following jobs: (1) Receiving updates from intercept agent 16 and adds them to an update log it maintains; (2) Sending updates asynchronously to backup agent 28; and (3) Servicing all I/O requests redirected to it by intercept agent 16, where such redirection is as a result of primary site 12 data unavailability (e.g., primary site 12 failure).

To minimize the performance degradation during the data unavailability at primary site 92, we have added the concept of a "hot cache" maintained by intelligent staging agent 102. The "hot data" maintained by intelligent staging agent 102 is used whenever a primary host 14 at primary site 12 does not have the data available and intelligent staging agent 102 is contacted to retrieve the most up-to-date data copy. Intelligent staging agent 102 receives access patterns and statistics from intelligent intercept agent 100. Based on that information, intelligent staging agent 102 makes intelligent guesses about which data sets are likely to be needed in the near future. In the preferred embodiment, an interface to intelligent staging agent 102 is provided, where such interface can be utilized by a system administrator to instruct intelligent staging agent 102 to consider specified data-sets as hot. Many different criteria can be used to determine if a piece of data is hot or not. Next, the concept of "hot data" will be explained.

Hot Data

Various criteria is used in identifying a data as "hot." The following is a number of such criteria which can be utilized in making a determination as to the "hotness" of data files:
- The more the file is used the more important it potentially is.
- The greater the number of users using a particular file, the larger the set of users will be affected if the data is not available.
- The time of access of a file can also determine its importance in some settings. For example if a file is normally accessed in the evening or on a weekend, it may be claimed to be less critical than the files that are accessed in the beginning of a workday.
- Certain well-known executables and system files are important as they are necessary for the proper execution of the system.
- System and user configuration files might be necessary for the users to login to their systems. These files, if they reside on the storage in question, can be considered "hot".
- The administrator can also configure certain directories as important as they might belong to important applications that run on primary site 92.
- Certain users' files (e.g. the CEO's mails) might be considered more important than others.
- If a person is on leave then probably that user's files should not be considered hot for the duration of his/her leave. These and other such criteria based on real-world knowledge could be specified by an administrator if needed.
- Smaller files may be given some preference during caching.
- Meta-data information is normally very useful to keep in local cache 94 and can be considered hot. In fact, intelligent staging agent 102 can maintain a full copy of the meta-data locally for efficiency during data unavailability at primary site 92.
- The content of files can also indicate the "hotness" of files.
- The filename or its extension might indicate how important the file is. For example, foo.c is potentially more important that foo.o as the latter can be regenerated from the former. Well known filenames, like the system log files, can be assigned appropriate "hotness" as well.

The hotness of a data block can be dealt with in a similar fashion. Although there are no names for data blocks, but there could be some well-known data blocks that are of more importance. Similar to files, the data blocks that are used with a higher frequency by a large number of users or by some important users can be considered hot.

Cache Replacement

As part of caching data at local cache 94, intelligent staging agent 102 also decides on what cached data to replace when local cache 94 is full. Intelligent staging agent 102 can use a cache replacement policy based on access patterns. Popular schemes such as LRU and its successors, LFU, and ARC can be used under different situations. No particular algorithm is specified, because architecture 92 does not preclude any. The cache miss information and the cache replacement information can be used by intelligent backup agent 104 to perform intelligent data reorganization such that data accesses to remote site 24 is efficient. For instance, intelligent staging agent 102 can track replaced cache data-sets. Such information can be piggybacked to intelligent backup agent 104 whenever update data is replicated from intelligent staging agent 102 to remote site 24. Intelligent backup agent 104 can extract such information and perform appropriate optimizations.

Intelligent Backup Agent

Similar to backup agent 28 in architecture 10, intelligent backup agent 104 is responsible for replaying update requests to reconstruct secondary copies of data. In addition, intelligent backup agent 104 also analyzes the access patterns and statistics (e.g., cache miss ratio and replacement patterns) are sent by intelligent staging agent 102. Based on the analysis, it can perform optimizations, such as data reorganization, to improve I/O performance whenever intelligent backup agent 104 is asked to retrieve some data. One example of data reorganization is to duplicate the data that are accessed frequently, and store them in some sequential fashion. If primary site 92 fails, intelligent backup agent 104 applies all pending updates to the persistent storage, to give administrators the ability to create a copy of the latest data at remote site 24.

Data Access Agent

Data access agent 98 acts as a client to primary site 92 data. It can both read and write data to primary site 92 storage. It is used for two purposes. First, it is used by intelligent staging agent 102 to read data from primary site 92 that has been determined to be "hot", and for which it has been decided a second copy should be kept at local cache 94. Secondly, after a failure, when hardware issues have been resolved at primary site 92, intelligent staging agent 102 utilizes data access agent 98 to write the data that primary site 92 had missed during the time of its unavailability. The pending data are stored in intelligent staging agent 102 logs and flushed out through an interface provided by data access agent 98. Data access agent 98 can be located anywhere on primary site 92, where it has read/write access to primary site 92 data. Data access agent 98 is capable of restoring and accessing all primary site 92 data. In an alternative embodiment, data access agent 98 can be co-located with intelligent staging agent 102 at network appliance 20.

Automated Recovery

Intelligent staging agent 102 assists in bringing primary site 92 back up-to-date after a failure. Whenever intelligent intercept agent 100 fails to write to the primary site's storage, it informs intelligent staging agent 102 about the failure and the update request. Intelligent staging agent 102 keeps the updates in its log so that they can be replayed to primary site 92 once the primary site's failure has been repaired. Typically, the primary site 92 storage will first be recovered from some backup tapes. Then all the updates that are issued after that backup time must be applied to bring the primary storage fully up to date. One way to do this is to create a latest tape backup at remote site 24 after the failure, and use that tape for the primary storage restoration. Once restored, the primary storage is only missing a subset of the data, which is located in the log of intelligent staging agent 102. Intelligent staging agent 102, when instructed by a system administrator, can replay these updates to primary site 92 by using data access agent 98. When primary site 92 has been brought up-to-date, intercept agent 100 is informed and normal operation of primary site 92 is resumed.

Figure 5:
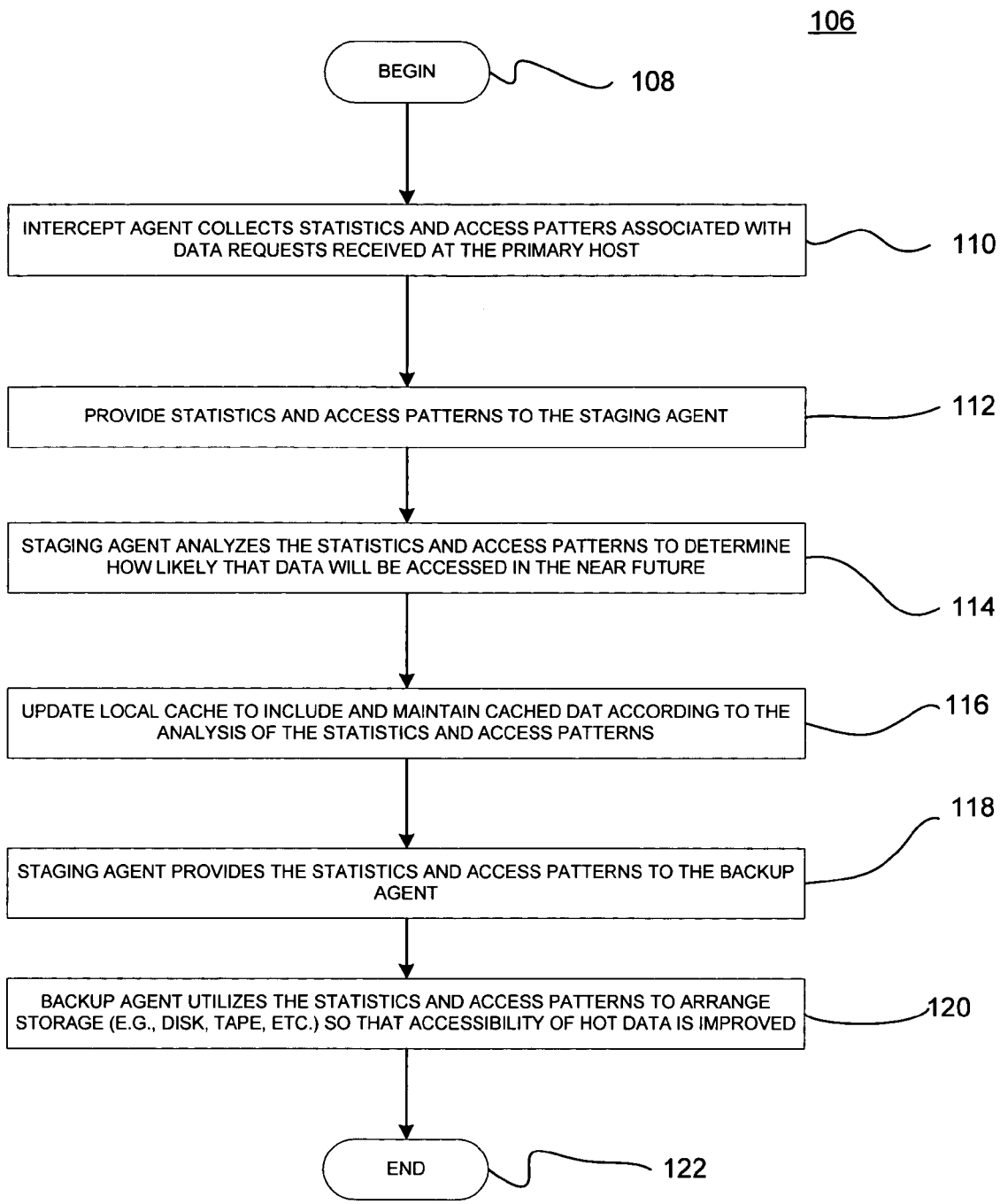
FIG. 5 illustrates a method of intelligently caching data to minimize system downtime at intelligent appliance-based business continuance architecture.

FIG. 5 illustrates a method 106 of intelligently caching data to minimize system downtime at intelligent appliance-based business continuance architecture 92. At block 108, method 106 begins.

At block 110, intelligent intercept agent 100 collects statistics and access patterns associated with data requests received at primary host 14. The statistics and access patterns can be used by intelligent staging agent 102 and intelligent backup agent 104 to predict what data-sets are likely to be accessed in the near future, also known as "hot data". Hot data will be more full explained below under the "Hotness of Files and Directories" section.

At block 112, intelligent intercept agent 100 provides the collected statistics and access patterns to intelligent staging agent 102.

At block 114, intelligent staging agent 102 analyzes the received statistics and access patterns to determine how likely data maintained by primary host 14 will be accessed in the near future.

At block 116, intelligent staging agent 102 updates local cache 94 according to the analysis at block 114. Intelligent staging agent 102 caches data in local cache 94 based on hot (e.g., frequency of access, time of access, etc.). For example, intelligent staging agent 102 can update local cache 94 to include new data, modify existing data or remove existing data. Importantly, local cache 94 can consists of one or more disks. Hence, local cache 94 can be quite large.

Upon deciding to cache primary site 12 data, intelligent staging agent 102 must obtain a copy of the data. This is accomplished in one of three ways. First, through utilization of update records forwarded by intelligent intercept agent 100. Second, data access agent 98, which runs on primary host 14 and can read the primary site's data and return to intelligent staging agent 102 upon request. Third, intelligent backup agent 104, which is remote, can also return a copy of the needed data, as and when requested by intelligent staging agent 102. Having data access agent 98 provide the data is potentially much faster than reading from remote site 24, as the data access agent 98 is local. However, utilizing data access agent 98 will introduce additional I/O load on primary site 12. Unless the applications are not very sensitive to the increased I/O load, it may be desirable to retrieve data from remote site 24. In the preferred embodiment, intelligent staging agent 102 can make dynamic decisions about where to get the needed data (i.e., "hot data") from, based on primary site 12 load and the connection to remote site 24. The decision could also be determined by a dynamic cost evaluation model, be time determined, or simply be specified by a system administrator.

Returning to method 106. At block 118, intelligent staging agent 102 provides the statistics and access patterns to intelligent backup agent 104.

At block 120, intelligent backup agent 104 utilizes the statistics and access patterns to arrange storage (e.g., disk, tape, etc.) at remote site 24, so that data accessibility is optimized. That is, intelligent backup agent 104 performs optimizations to reorganize data at remote site 24 in such a way that access to frequently requested ("hot") data-sets is efficient.

At block 122, method 106 ends.

Figure 6:
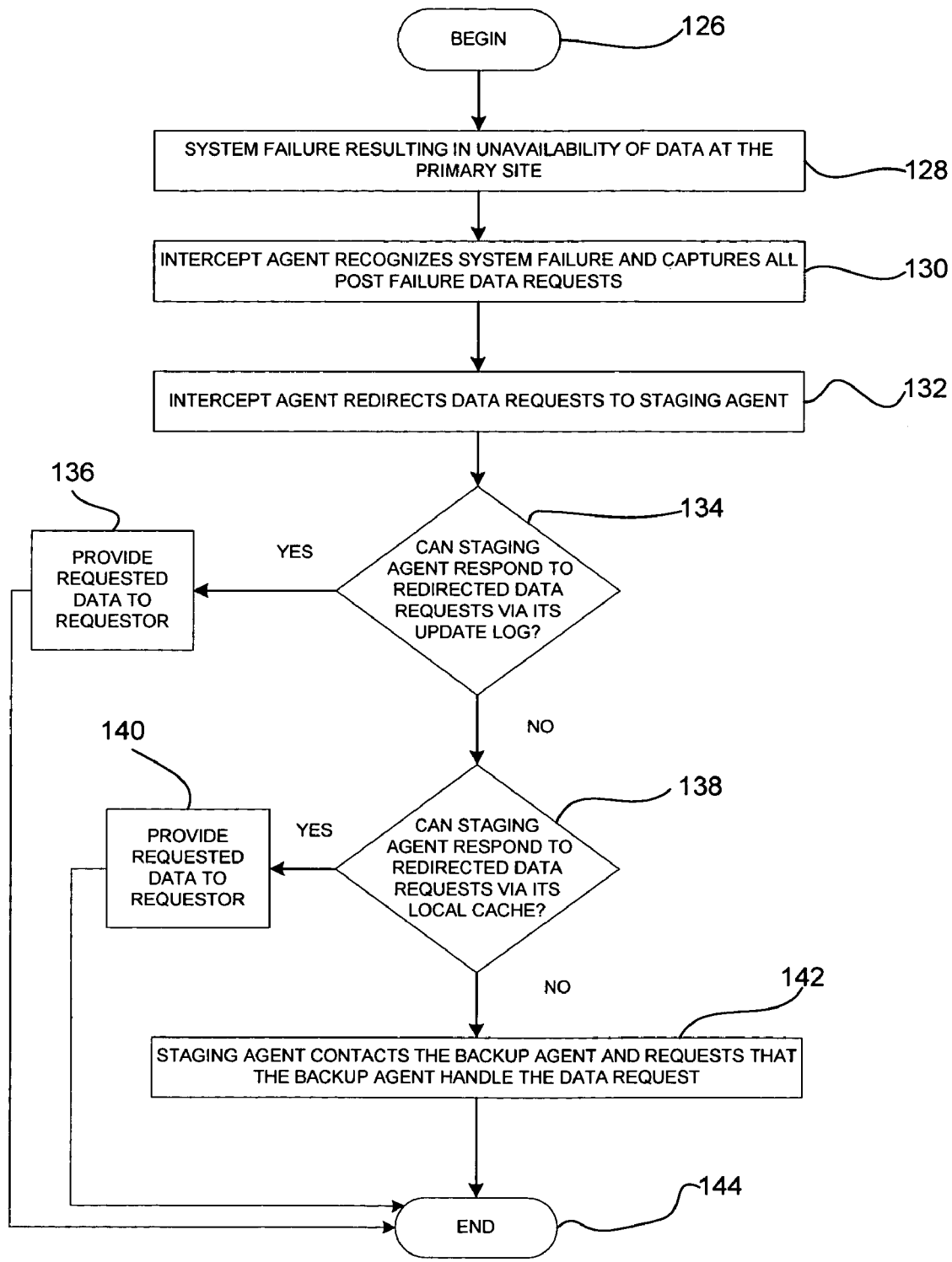
FIG. 6 illustrates a method of handling data requests in intelligent appliance-based business continuance architecture upon primary host failure.

FIG. 6 illustrates a method 124 of handling data requests in intelligent appliance-based business continuance architecture 92 upon primary host 14 failure. At block 126, method 124 begins.

At block 128, a primary site 12 primary host fails. Such system failure results in unavailability of data to requesting applications.

At block 130, intelligent intercept agent 100 detects the failure of a primary site 12 primary host 14.

At block 132, intelligent intercept agent 100 redirects application data requests from primary host 14 to intelligent staging agent 102.

At block 134, a determination is made as to whether intelligent staging agent 102 can respond to the redirected data request via its update log. If yes, then at block 136, the data is retrieved and provided by intelligent staging agent 102 to intelligent intercept agent 100. Intelligent intercept agent 100 utilizes the provided information to satisfy the requesting applications data request.

Returning to block 134. If no, then at block 138, a determination is made as to whether intelligent staging agent 102 can respond to the redirected data request via local cache 94. If yes, then at block 140, the data is retrieved and provided by intelligent staging agent 102 to intelligent intercept agent 100. Intelligent intercept agent 100 utilizes the provided information to satisfy the requesting applications data request. Most requests can be satisfied via local cache 94, providing there has been sufficient time for the intelligent staging agent 102 to build up local cache 94. Given a large enough local cache 94 and good data access pattern prediction, the cache miss ratio can be small. Since accessing intelligent staging agent 102 is typically fast (though not as fast as local access at primary site 12), the performance degradation due to primary host 14 failure at primary site 12 is small. More importantly, data will be accessible continuously, hence no system downtime is observed. Traditional synchronous mirroring scheme can also provide continuous data accessibility after disk failures at primary site 12, as long as data can be read from remote site 24. But such data accesses have extremely long latencies. In practice, such schemes are rarely used. Instead, the applications are moved to remote site 24. However, such a solution is very expensive and unaffordable in general for Small and Medium Businesses.

Returning to block 138. If no, then at block 142, intelligent staging agent 102 contacts intelligent backup agent 104 and requests that intelligent backup agent 104 handle the data request. Upon locating the requested data, intelligent backup agent 104 provides to intelligent intercept agent 100 via intelligent staging agent 102.

At block 144, method 124 ends.

Studies such as "Characteristics of I/O Traffic in Personal Computer and Server Workloads (IBM Systems Journal, 42(2), 2003, W. W. Hsu and A. J. Smith), show that for server workloads on average, only about 2-3.3% of the data is updated daily. This means that as long as we can accurately cache a fair amount of data via intelligent staging agent 102 at local cache 94, the cached data could sustain a fairly long time of data access without going to remote site 24. Thus, with a sufficiently large local cache 94, a few days of accesses could be sustained, with a very small cache miss ratio.

While the accesses are served out of local cache 94, the failed storage components at primary site 12 can be recovered. For disk failures, remote site 24 can send the newest backup copy on tape to primary site 12 and perform a restore. Note that sending tape using mail may still be much cheaper and/or faster than recovering over the long distance network.

Thus, a method and system to minimize downtime through intelligent data caching in an appliance-based business continuance architecture is provided. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for minimizing downtime in an appliance-based business continuance architecture, comprising:
    at least one primary data storage;
    at least one primary host machine, wherein the primary host machine can access data stored at the primary data storage;
    an intercept agent at the primary host machine to intercept data requests made to the host machine and to collect access patterns and statistics associated with the intercepted data requests, wherein the intercepted data requests include data read requests and data write requests;
    at least one business continuance appliance in communication with the intercept agent at the primary host machine and in communication with a remote backup site, wherein the business continuance appliance receives information associated with the intercepted data requests from the intercept agent;
    a local cache included within the business continuance appliance, wherein the local cache maintains copies of data associated the intercepted data requests, wherein the copies are maintained according to the access patterns and statistics received; and
    the remote backup site to be provided with the intercepted data requests via the business continuance appliance, wherein the remote backup site maintains a secondary copy of the data located at the primary data storage, whereby the data maintained by the local cache is utilized to provide a backup copy of data in the event of the primary site failing, without resorting to access of the remote backup site.

2. The system of claim 1 wherein the business continuance appliance includes a staging agent, wherein the staging agent handles the receiving of the information associated with the intercepted data requests from the intercept agent, the received information includes:
    the intercepted data requests;
    data associated with the intercepted data request, when the intercepted data requests comprise requests to update data at the primary storage; and
    the access patterns and statistics collected by the intercept agent.

3. The system of claim 2 wherein the staging agent forwards the information received from the intercept agent to the remote backup site.

4. The system of claim 2 wherein the staging agent is responsible for maintaining the local cache copies of the data associated with the intercepted data requests, wherein the staging agent utilizes the access patterns and statistics received to determine which copies of the data are to be maintained and to determine at what location within the local cache the copies of the data are to be stored.

5. The system of claim 4 further comprises utilizing a cache replacement algorithm to determine which copies of the data are to be maintained and to determine at what location within the local cache the copies of the data are to be stored.

6. The system of claim 1 wherein the local cache comprises at least one disk drive.

7. The system of claim 1 wherein the local cache comprises a RAM.

8. The system of claim 1 wherein the remote backup site includes a backup agent, wherein the backup agent receives information associated with the intercepted data requests from the business continuance appliance, the received information associated with the intercepted data requests including:
    the collected access patterns and statistics;
    data associated with data update requests; and
    new data, wherein new data includes data written to the primary storage for the first time.

9. The system of claim 8 wherein the backup agent utilizes the collected access patterns and statistics to organize the storage of the secondary copies of data at the remote backup site, wherein organizing the data includes organizing the data according to its size and organizing the data according to its demand.

10. The system of claim 1 further comprises the intercept agent:
    monitoring the health of the primary site and recognizing when the primary site fails;
    capturing all future application data requests submitted to the primary site upon recognizing that the primary site has failed; and
    redirecting the captured data requests to the business continuance appliance.

11. The system of claim 10 wherein the business continuance appliance checks the local cache if the captured data requests are read requests, in an attempt to satisfy the captured data requests, wherein if the requested data can be satisfied via the local cache, the business continuance appliance provides the requested data to the intercept agent.

12. The system of claim 11 wherein the intercept agent provides the requested data received from the staging agent to the requesting application associated with the captured data request.

13. The system of claim 12 wherein if the business continuance appliance is unable to satisfy the data request, the staging agent redirects the data request to the remote backup site.

14. The system of claim 13 wherein if the remote backup site can satisfy the data request, the backup agent provides the data to the staging agent, wherein the staging agent further provides the data to the intercept agent.

15. An article of manufacture for minimizing downtime in an appliance-based business continuance architecture, comprising:
- a business continuance appliance in communication with a primary host machine and in communication with a remote backup site, wherein the business continuance appliance receives data requests and information associated with the data requests from the primary host, wherein the data requests include all read and write requests made to the primary host;
- a local cache included within the business continuance appliance, wherein the local cache maintains copies of data associated with the data requests, wherein the copies are maintained according to the received information associated with the data requests,
- whereby the data maintained by the local cache is utilized to provide a backup copy of data in the event of the primary site failing, without resorting to access of the remote backup site.

16. The article of manufacture of claim 15 wherein the received information comprises:
- a description of the data request, including the type of the data request, wherein the type consists of read requests and write requests;
- data associated with the data requests, when the data request is a write request; and
- access patterns and statistics associated with the data requests, wherein the access patterns and statistics are collected at the primary host.

17. The article of manufacture of claim 16 wherein the business continuance appliance includes a staging agent, wherein the staging agent handles the receiving of the information associated with the data requests.

18. The article of manufacture of claim 17 wherein the staging agent forwards the received information to the remote backup site.

19. The article of manufacture of claim 18 wherein the staging agent is responsible for maintaining the local cache copies of the data associated with the data requests, wherein the staging agent utilizes the received information to determine which copies of the data are to be maintained and to determine at what location within the local cache the copies of the data are to be stored.

20. The article of manufacture of claim 19 further comprises utilizing a cache replacement algorithm to determine which copies of the data are to be maintained and to determine at what location within the local cache the copies of the data are to be stored.

21. The article of manufacture of claim 16 wherein the local cache comprises at least one disk drive.

22. The article of manufacture of claim 16 wherein the local cache comprises a RAM.

23. A method for deploying an appliance-based business continuance system in which downtime is minimized in response to a failure, comprising:
- integrating computer-readable code into the system, wherein the code in combination with the system is capable of:
  - intercepting data requests made to the system and collecting access patterns and statistics associated with the intercepted data requests, wherein the intercepted data requests include data read requests and data write requests;
  - maintaining a local cache at a business continuance appliance within the system, wherein the local cache maintains copies of data associated the intercepted data requests, wherein the copies are maintained according to the collected access patterns and statistics;
  - maintaining backup copies of the system data at a remote backup site; and
  - responding to a failure in which the system's primary storage is unable to satisfy the intercepted data requests, through utilizing the local cache and the remote backup site, wherein the remote backup site is accessed to handle the intercepted data requests which were not satisfied by the local cache.

24. A computer program product comprising a computer readable storage medium having instruction codes tangibly embodied thereon for minimizing downtime in an appliance-based business continuance architecture, the codes comprising:
- a first set of instruction codes for intercepting data requests made to a host machine and to collect access patterns and statistics associated with the intercepted data requests, wherein the intercepted data requests include data read requests and data write requests;
- a second set of instruction codes for providing communication between the host machine, a business continuance appliance and a remote backup site, wherein the business continuance appliance receives information associated with the intercepted data requests from the host machine;
- a third set of instruction codes for maintaining a local cache included within the business continuance appliance, wherein the local cache stores copies of data associated the intercepted data requests, wherein the copies are maintained according to the received information associated with the data requests; and
- a fourth set of instruction codes for providing the remote backup site with the intercepted data requests via the business continuance appliance, wherein the remote backup site maintains a secondary copy of the data located at the primary host,
- whereby the data maintained by the local cache is utilized to provide a backup copy of data in the event of the primary site failing, without resorting to access of the remote backup site.

25. The computer program product of claim 24 further comprises instructions for recognizing that the host machine has failed.

26. The computer program product of claim 24 further comprises instructions for notifying the business continuance appliance of the host machine failure, wherein the business continuance appliance responds by satisfying all data read requests via the local cache if the data associated with the data requests is maintained by the local cache, otherwise the business continuance appliance forwards the data requests to the remote backup site.

* * * * *